United States Patent
Karsi

(10) Patent No.: US 11,057,833 B2
(45) Date of Patent: Jul. 6, 2021

(54) CROSS-LAYER SLEEP CONTROL IN A WIRELESS DEVICE

(71) Applicant: Tracie Wireless LLC, Burlington, MA (US)

(72) Inventor: Murat Karsi, San Diego, CA (US)

(73) Assignee: TRACIE WIRELESS LLC, Burlington, MA (US)

( * ) Notice: Subject to any disclaimer, the term of this patent is extended or adjusted under 35 U.S.C. 154(b) by 37 days.

(21) Appl. No.: 15/986,698

(22) Filed: May 22, 2018

(65) Prior Publication Data

US 2018/0343616 A1 Nov. 29, 2018

Related U.S. Application Data

(60) Provisional application No. 62/510,620, filed on May 24, 2017.

(51) Int. Cl.
*H04W 52/02* (2009.01)
*H04W 88/02* (2009.01)

(52) U.S. Cl.
CPC ........ *H04W 52/0235* (2013.01); *H04W 88/02* (2013.01)

(58) Field of Classification Search
None
See application file for complete search history.

(56) References Cited

U.S. PATENT DOCUMENTS

| | | | | |
|---|---|---|---|---|
| 6,522,873 B1* | 2/2003 | Moles | ................... | H04W 68/00 455/343.1 |
| 6,604,201 B1* | 8/2003 | Takahashi | ............... | H04L 12/12 713/323 |
| 8,804,050 B1* | 8/2014 | MacLeod | ........... | H04N 21/4436 348/730 |
| 2002/0026598 A1* | 2/2002 | Osborn | ............. | H04W 52/0258 713/323 |
| 2004/0088589 A1* | 5/2004 | Westerinen | ............. | G06F 1/305 713/300 |
| 2005/0283625 A1* | 12/2005 | Rotem | .................. | G06F 1/3203 713/300 |
| 2006/0031692 A1* | 2/2006 | Kato | ..................... | G06F 1/3203 713/300 |
| 2007/0268200 A1* | 11/2007 | Fuller | .................. | G06F 1/3265 345/1.1 |

(Continued)

OTHER PUBLICATIONS

International Search Report and Written Opinion issued in International Application No. PCT/US2018/33954 dated Aug. 7, 2018 in 13 pages.

*Primary Examiner* — Christopher T Wyllie
(74) *Attorney, Agent, or Firm* — Procopio Cory Hargreaves and Savitch LLP; Pattric J. Rawlins; Jonathan D. Cheng

(57) ABSTRACT

Cross-layer sleep control in a wireless device. In an embodiment, parameter(s) are stored in association with a system component and each of a plurality of power-saving configurations. When a predetermined type of event is detected, a next event and a time span until the next event is anticipated to occur is determined. For each system component required for the next event, the parameter(s) associated with the system component are retrieved for each power-saving configuration, and one of the power-saving configurations is selected based on the retrieved parameter(s) and the time span. Each system component is then control to transition to its selected power-saving configuration.

10 Claims, 4 Drawing Sheets

(56) References Cited

U.S. PATENT DOCUMENTS

| | | | |
|---|---|---|---|
| 2010/0104309 A1* | 4/2010 | Ferlitsch | G03G 15/2039 399/70 |
| 2012/0184313 A1* | 7/2012 | Ptasinski | H04W 52/0216 455/509 |
| 2012/0191994 A1* | 7/2012 | Sun | H04W 52/027 713/320 |
| 2012/0213177 A1* | 8/2012 | Lee | H04W 72/0406 370/329 |
| 2013/0124362 A1* | 5/2013 | Katcher | G06Q 30/0633 705/26.8 |
| 2013/0125130 A1 | 5/2013 | Stubbs et al. | |
| 2015/0144434 A1* | 5/2015 | Herkel | B66B 1/302 187/276 |
| 2015/0282087 A1* | 10/2015 | Yang | H04W 52/0261 370/311 |
| 2015/0347204 A1* | 12/2015 | Stanley-Marbell | G06F 9/4893 719/318 |
| 2015/0350807 A1 | 12/2015 | Andrews et al. | |
| 2015/0351037 A1 | 12/2015 | Brown et al. | |
| 2015/0365892 A1* | 12/2015 | Ma | H04W 52/0209 455/574 |
| 2016/0112951 A1* | 4/2016 | Batra | H04W 4/80 370/311 |
| 2016/0142974 A1* | 5/2016 | Lindoff | H04W 52/0229 370/311 |
| 2016/0370853 A1* | 12/2016 | Zou | H02J 7/35 |
| 2017/0019853 A1* | 1/2017 | Ghosh | H04W 52/0216 |
| 2017/0118626 A1* | 4/2017 | Sadhu | G01S 19/17 |
| 2017/0192492 A1* | 7/2017 | Li | G06F 1/206 |
| 2018/0120927 A1* | 5/2018 | Ma | G06F 3/0685 |
| 2018/0343616 A1* | 11/2018 | Karsi | H04W 52/0235 |

* cited by examiner

CROSS-LAYER SLEEP CONTROL IN A WIRELESS DEVICE

CROSS-REFERENCE TO RELATED APPLICATIONS

This application claims priority to U.S. Provisional Patent App. No. 62/510,620, filed on May 24, 2017—the entirety of which is hereby incorporated herein by reference as if set forth in full.

BACKGROUND

Field of the Invention

The embodiments described herein are generally directed to power savings in a wireless device, and, more particularly, to cross-layer control of system components to operate in power-saving configurations in order to reduce power consumption in the wireless device.

Description of the Related Art

Today, there are a ubiquity of devices which communicate, at least at times, via wireless means. Such devices, include, without limitation, wireless cell phones, paging devices, position trackers that transmit and receive data according to a wireless standard, cellular communications devices operating according to 3rd Generation Partnership Project (3GPP) standards, user equipment (UE) operating according to 3GPP Long Term Evolution (LTE) standards, Bluetooth™ devices, Zigbee™ devices, wireless communication devices that communicate according to variants of the 802.11 family of standards, and the like. As used herein, the term "wireless device" is contemplated to include all such devices, as well as any other device that communicates wirelessly.

Typically, wireless devices communicate with other wireless devices, such as wireless infrastructure ports. A wireless infrastructure port is a communications device that can wirelessly transmit data to another wireless device, wirelessly receive data from another wireless device, and act as a connection point to a communications network. Examples of wireless infrastructure ports include access points that communicate according to the 802.11 family of standards, cellular base stations, a 3GPP LTE Evolved Node Bs (eNodeB), Bluetooth™ devices, Zigbee™ devices, cellular repeaters, range extenders, and the like.

Wireless devices, including wireless infrastructure ports, may have both transmission and reception functionalities. Therefore, in describing communications, a wireless device that is transmitting may be referred to as a "transmitting node," and a wireless device that is receiving may be referred to as a "receiving node." It should be understood that a wireless device may be both a transmitting node and a receiving node, simultaneously and/or at different times.

Many wireless devices are operated by a battery. In such devices, the battery life is a key performance criterion. As used herein, a "non-active time" refers to a time interval between active times during which a wireless device is performing transmission and/or reception. Typically, in the aggregate, non-active times occupy a significantly larger fraction of a wireless device's lifetime than active times. Thus, the overall drain on the battery of a wireless device may be significantly impacted when non-active times consume significant amounts of power.

Typically, wireless communications standards do not specify the behavior of a wireless terminal during non-active times. Rather, such standards focus on the sequence of transmission and reception actions that the wireless terminal performs (i.e., the active times). In some instances, the wireless communication standards may facilitate well-known, long-duration time intervals during which the wireless terminal is not anticipated to have any communications with a wireless infrastructure port. The wireless terminal may utilize these time intervals to exercise measures for reducing power consumption. For example, in the 3GPP LTE standards, a wireless terminal, in the Radio Resource Control (RRC) idle state, typically knows that it only needs to monitor a paging opportunity once every paging cycle (e.g., 0.32, 0.64, 1.28, or 2.56 seconds).

The measures that a wireless terminal may exercise to reduce power consumption during non-active times are typically referred to as "sleep" or "standby" modes. Typically, the specifics of such measures are not specified in the wireless communications standards. Rather, such measures are usually implementation-dependent and designed at the discretion of manufacturers of the wireless terminals.

If not controlled, continuous current draw during non-active times may quickly deplete a wireless device's battery. Accordingly, the reduction of power consumption in a battery-operated wireless device during non-active times would be especially beneficial. However, it should be understood that the embodiments described herein may also be applied to non-battery-operated wireless devices.

SUMMARY

Systems, methods, and non-transitory computer-readable media are disclosed for power-saving control in a wireless device.

In an embodiment, a method is disclosed, which comprises using at least one hardware processor to: for each of one or more system components and for each of a plurality of power-saving configurations, store one or more parameters associated with the system component and the power-saving configuration; and, when a detected event is of a predetermined type of event, determine a next event that is anticipated to follow the detected event, determine a time span from a current time until a time at which the next event is anticipated to occur, determine at least one of the one or more system components required for the next event, and, for the at least one system component, for each of one or more of the plurality of power-saving configurations, retrieve the one or more parameters associated with the at least one system component and the power-saving configuration, select one of the plurality of power-saving configurations to be used for the at least one system component based on the retrieved one or more parameters and the time span, and control the at least one system component to transition to the selected power-saving configuration.

In another embodiment, a wireless device is disclosed, which comprises: a battery; and at least one hardware processor configured to, for each of one or more system components and for each of a plurality of power-saving configurations, store one or more parameters associated with the system component and the power-saving configuration, and, when a detected event is of a predetermined type of event, determine a next event that is anticipated to follow the detected event, determine a time span from a current time until a time at which the next event is anticipated to occur, determine at least one of the one or more system components required for the next event, and, for the at least one system component, for each of one or more of the plurality of power-saving configurations, retrieve the one or more parameters associated with the at least one system component and the power-saving configuration, select one of the plurality of power-saving configurations to be used for the at least one system component based on the retrieved one or more parameters and the time span, and control the at least one system component to transition to the selected power-saving configuration.

In an additional embodiment, a non-transitory computer-readable medium having instructions stored therein is disclosed, wherein the instructions, when executed by a processor, cause the processor to: for each of one or more system components and for each of a plurality of power-saving configurations, store one or more parameters associated with the system component and the power-saving configuration; and, when a detected event is of a predetermined type of event, determine a next event that is anticipated to follow the detected event, determine a time span from a current time until a time at which the next event is anticipated to occur, determine at least one of the one or more system components required for the next event, and, for the at least one system component, for each of one or more of the plurality of power-saving configurations, retrieve the one or more parameters associated with the at least one system component and the power-saving configuration, select one of the plurality of power-saving configurations to be used for the at least one system component based on the retrieved one or more parameters and the time span, and control the at least one system component to transition to the selected power-saving configuration.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for power-saving control in a wireless device. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview 1.1. Infrastructure

Figure 1:
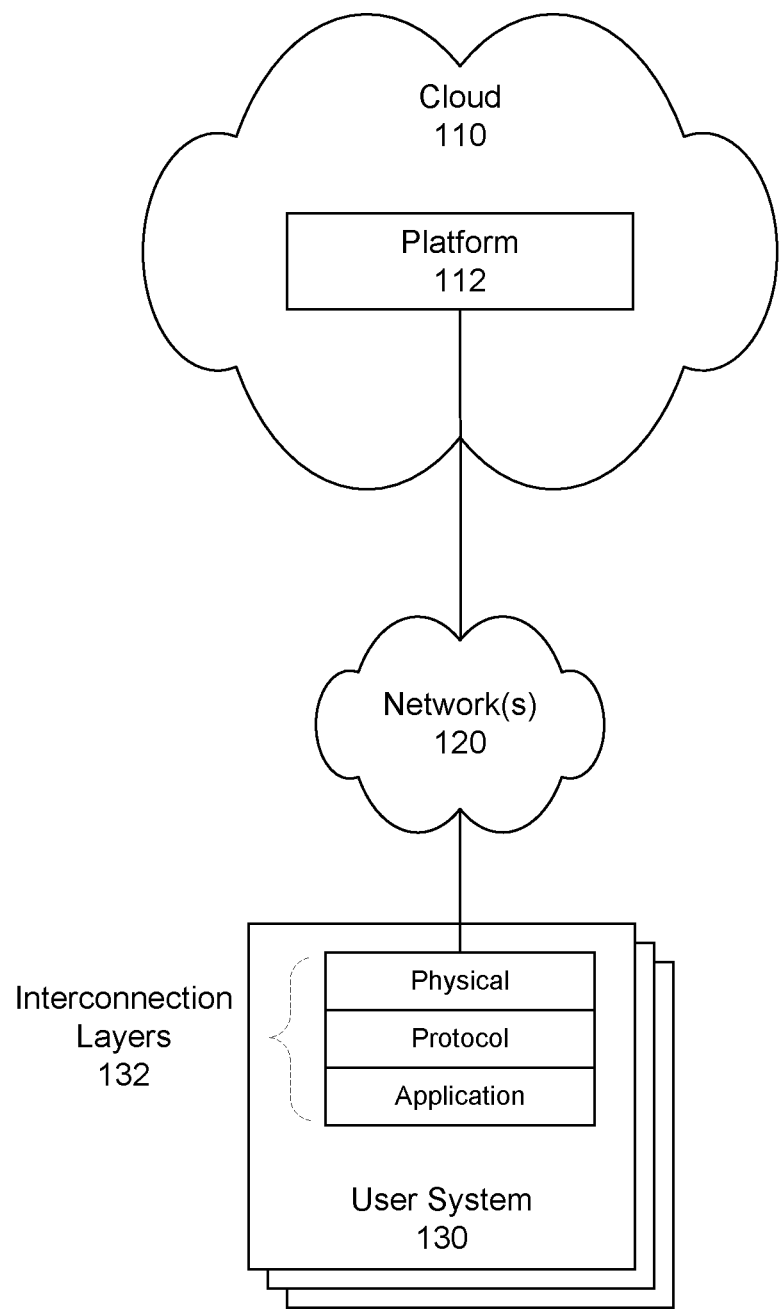
FIG. 1 illustrates an example infrastructure, in which one or more of the processes described herein, may be implemented, according to an embodiment.

FIG. 1 illustrates an example infrastructure for power-saving control, according to an embodiment. The infrastructure may comprise a platform 112 (e.g., one or more servers, applications, databases, services, networks, and/or resources) which hosts and/or executes one or more of the various processes described herein, for example, as software implementing the various processes. As illustrated, platform 112 is comprised in a cloud 110, such that platform 112 is implemented using on-demand access to a pool of collocated and/or dispersed resources (e.g., servers, applications, databases, services, networks, etc.) that are shared with other entities (e.g., other platforms). Cloud 110 may comprise a public cloud, private cloud, and/or other cloud type, including a hybrid cloud comprising a combination of different clouds and/or cloud types. In an alternative infrastructure without cloud 110 or in addition to cloud 110, platform 112 may comprise one or more dedicated resources (e.g., servers, applications, databases, services, networks, etc.) that are not shared with other entities.

As illustrated, platform 112 is communicatively connected to one or more user systems 130 via one or more networks 120. Network(s) 120 may comprise the Internet, and platform 112 may communicate with user system(s) 130 through the Internet using standard transmission protocols, such as HyperText Transfer Protocol (HTTP), Secure HTTP (HTTPS), File Transfer Protocol (FTP), FTP Secure (FTPS), SSH FTP (SFTP), and/or the like, as well as proprietary protocols. Network(s) 120 may also comprise one or more wireless networks, such as a cellular network that employs the LTE standard for high-speed wireless communications. While platform 112 is illustrated as being connected to all user systems 130 through a single set of network(s) 120, it should be understood that platform 112 may be connected to different user systems 130 via different sets of network(s).

Platform 112 may comprise a web service which receives requests from user system(s) 130, and provides responses in JavaScript Object Notation (JSON), eXtensible Markup Language (XML) and/or any other suitable or desired format. In such embodiments, platform 112 may provide an application programming interface (API) which defines the manner in which user system(s) 130 may interact with the web service. Thus, user system(s) 130 can define their own user interfaces, and rely on the web service to implement or otherwise provide the backend processes, storage, and/or the like. A client application executing on one or more user system(s) 130 may interact with a server application executing on platform 112 to execute one or more or a portion of one or more of the various processes described herein (e.g., implemented in software). The client application may be "thin," in which case processing is primarily carried out server-side by the server application on platform 112. Alternatively, the client application may be "thick," in which case processing is primarily carried out client-side by user system(s) 130. It should be understood that the client application on user system(s) 130 may perform an amount of processing, relative to the server application on platform 112, at any point along this spectrum between "thin" and "thick," depending on the design goals of the particular implementation.

User system(s) 130 may comprise any type or types of computing devices capable of wired and/or wireless communication, including without limitation, desktop computers, laptop computers, tablet computers, wireless terminals (e.g., smart phones or other mobile devices), servers, game consoles, televisions, set-top boxes, electronic kiosks, point-of-sale terminals, pagers, position tracking devices, household appliances, sensors, Internet-of-Things (IoT) devices, and/or the like. While only a few user systems 130 are illustrated, it should be understood that platform 112 may manage any number of user systems 130. Furthermore, it should be understood that, as used herein, the term "wireless device" may refer to the subset of user system(s) 130 which utilize wireless communications, and which are often battery-operated.

As illustrated, user system(s) 130 may implement a set of interconnection layers 132 to facilitate communications between applications executing on user system(s) 130 and platform 112 over network(s) 120. Although not shown, platform 112 may implement a similar or identical set of interconnection layers 132. In the illustrated embodiment, interconnection layers 132 comprise a physical layer, a protocol layer, and an application layer. However, this illustrated set of layers is merely representative and non-limiting. In an embodiment, interconnection layers 132 may conform or be similar to the Open Systems Interconnection (OSI) reference model, which includes a physical layer, data-link layer, network layer, transport layer, session layer, presentation layer, and application layer, in that order from lowest to highest. In any case, interconnection layers 132 provide functions for providing a flow of data between a physical layer, in which bits are physically conveyed to and from network(s) 120 (e.g., at the electrical, optical, and/or radio level), at the lowest level and an application layer, which receives data, to be communicated, from applications (e.g., executing on user system(s) 130) and passes communicated data to those applications, at the highest level.

1.2. Example Processing Device

Figure 2:
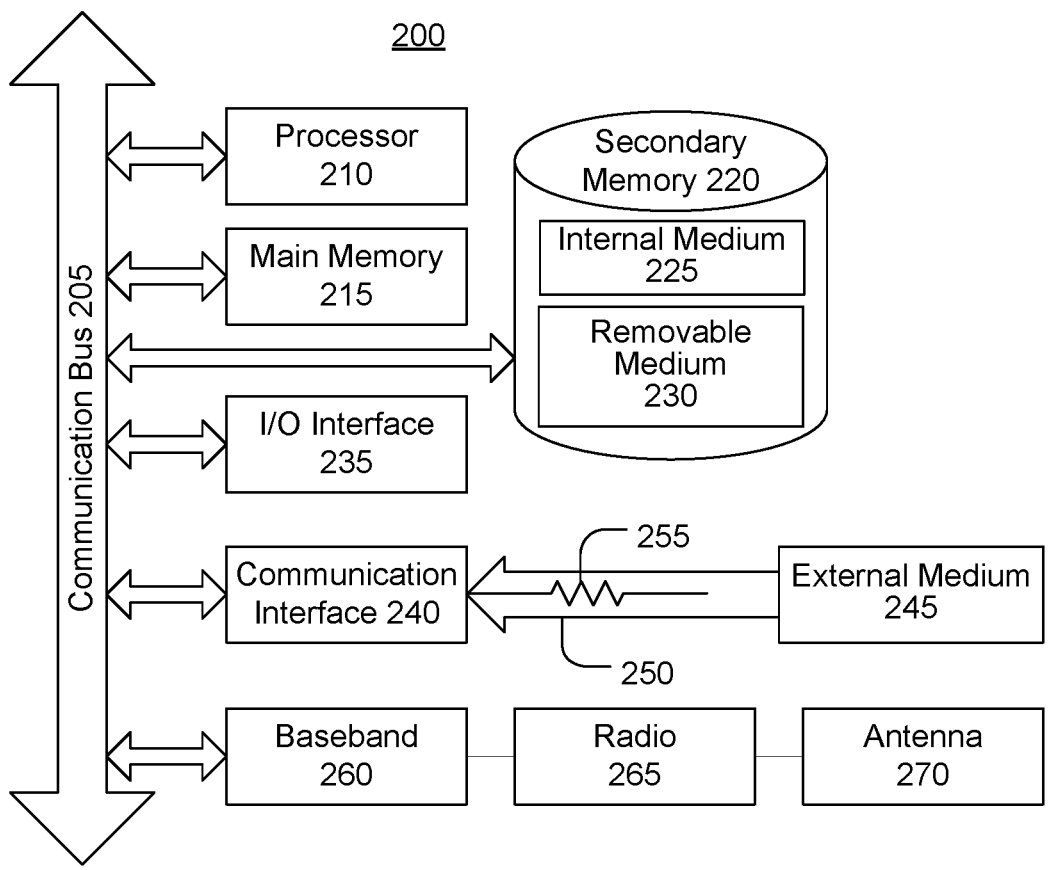
FIG. 2 illustrates an example processing system, by which one or more of the processed described herein, may be executed, according to an embodiment.

FIG. 2 is a block diagram illustrating an example wired or wireless system 200 that may be used in connection with various embodiments described herein. For example system 200 may be used in conjunction with one or more of the processes described herein (e.g., to execute software implementing the processes), and may represent components of platform 112, user system(s) 130 (e.g., the wireless devices discussed herein), and/or other processing devices described herein. System 200 can be any processor-enabled device that is capable of wired or wireless data communication. Other computer systems and/or architectures may be also used, as will be clear to those skilled in the art.

System 200 preferably includes one or more processors, such as processor 210. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 210. Examples of processors which may be used with system 200 include, without limitation, the Pentium® processor, Core i7® processor, and Xeon® processor, all of which are available from Intel Corporation of Santa Clara, Calif.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 200 preferably includes a main memory 215 and may also include a secondary memory 220. Main memory 215 provides storage of instructions and data for programs executing on processor 210, such as one or more of the functions and/or modules discussed above. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal memory 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, etc.

Removable storage medium 230 is a non-transitory computer-readable medium having stored thereon computer-executable code (e.g., disclosed software modules) and/or data. The computer software or data stored on removable storage medium 230 is read into system 200 for execution by processor 210.

In alternative embodiments, secondary memory 220 may include other similar means for allowing computer programs or other data or instructions to be loaded into system 200. Such means may include, for example, an external storage medium 245 and a communication interface 240, which allows software and data to be transferred from external storage medium 245 to system 200. Examples of external storage medium 245 may include an external hard disk drive, an external optical drive, an external magneto-optical drive, etc. Other examples of secondary memory 220 may include semiconductor-based memory such as programmable read-only memory (PROM), erasable programmable read-only memory (EPROM), electrically erasable read-only memory (EEPROM), or flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 200 with a network or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network, or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (i.e., computer programs, such as the disclosed application, or software modules) is stored in main memory 215 and/or the secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code (e.g., software and computer programs) to system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable mediums are means for providing executable code, programming instructions, and software to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform the features and functions described elsewhere herein.

In an embodiment, I/O interface 235 provides an interface between one or more components of system 200 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and the like.

System 200 may also include optional wireless communication components that facilitate wireless communication over a voice network and/or a data network. The wireless communication components comprise an antenna system 270, a radio system 265, and a baseband system 260. In system 200, radio frequency (RF) signals are transmitted and received over the air by antenna system 270 under the management of radio system 265.

In one embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive signal, which is sent from radio system 265 to baseband system 260.

Baseband system 260 decodes a signal. Baseband system 260 also codes the digital signals for transmission and generates a baseband transmit signal that is routed to radio system 265. The radio mixes the baseband transmit signal with an RF carrier signal generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs, such as the disclosed application, or software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments. For example, data storage areas 215 or 220 may include various software modules.

2. Process Overview

Embodiments of processes for power-saving control will now be described in detail. While the processes will be primarily described in the context of LTE systems, the processes are not limited to LTE systems. Rather, the processes may be applied to any wireless infrastructure network.

The described processes may be embodied in one or more software modules that are executed by one or more hardware processors, e.g., as the client and/or server applications discussed above, which may be executed wholly by processor(s) of platform 112, wholly by processor(s) of user system(s) 130, or may be distributed across platform 112 and user system(s) 130 such that some portions or modules are executed by platform 112 and other portions or modules are executed by user system(s) 130. The described processes may implemented as instructions represented in source code, object code, and/or machine code. These instructions may be executed directly by the hardware processor(s), or alternatively, may be executed by a virtual machine operating between the object code and the hardware processors.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

2.1. Wireless Device States

Over its lifetime, a wireless terminal will typically operate in a variety of states. For example, a wireless device may be operate in a connected state in which it has an active connection with an infrastructure network. In the 3GPP LTE standards, there are multiple tiers of connections possible between a UE and an eNodeB or the Evolved Packet Core (EPC). One example is the RRC connected state. In the RRC connected state, the cell, in which the UE is located, is known. Downlink data may be transmitted to the UE within the known cell, and the UE listens to downlink traffic to determine whether a downlink data transmission is scheduled for the UE.

Prior to reaching a connected state, a wireless device may operate in a connection-forming state. In the connection-forming state, the goal of the wireless device may be to reach a connected state. Thus, the wireless device may execute steps of a wireless protocol to reach this connected state. For example, in the 3GPP LTE standards, an RRC connection state is reached via execution of two steps: (1) random access procedure; and (2) RRC connection establishment. The request which initiates execution of the connection-forming state in a wireless device may originate at the wireless device (e.g., UE), a wireless infrastructure port (e.g., eNodeB), or the infrastructure network (e.g., EPC).

Prior to reaching a connection-forming state, the wireless device may operate in an idle state in which it is not in active communication with a wireless infrastructure port. For instance, this state may occur when the wireless device is powered off. Alternatively or additionally, in the idle state, the wireless device may passively monitor transmissions by the wireless infrastructure port in order to identify if a request is made for the wireless device to transition to a connection-forming state. For example, the 3GPP LTE standards define an RRC idle state in which the UE repeatedly monitors a paging opportunity once every paging cycle in order to identify if it is being paged. In basic LTE standards, a paging cycle may be 0.32 seconds, 0.64 seconds, 1.28 seconds, or 2.56 seconds.

2.2. Transmission and Reception Scenarios

A few transmission and reception scenarios will now be described. The described scenarios are merely illustrative, non-limiting examples that may occur between a wireless terminal and a wireless infrastructure port while the wireless terminal is functioning in the connected, connection-forming, or idle states. These scenarios are not meant to be exhaustive or cover all potential scenarios.

In an embodiment, a wireless terminal may transmit various types of messages, including, without limitation:

(1) In the connection-forming state, the wireless terminal may transmit a channel access message. For example, in the 3GPP LTE standards, this type of signaling, transmitted by the UE, is called a "Random Access Channel (RACH) Preamble."

(2) In the connection-forming state, the wireless terminal may transmit a connection request that requests a connection with a wireless infrastructure port or the infrastructure network. An example of such a connection request is the RRC connection request message in the 3GPP LTE standards.

(3) In the connected state, the wireless terminal may transmit data payloads that contain video, audio, and/or other types of data (e.g., email-related data, application data, etc.). For example, in the 3GPP LTE standards, such data is transmitted in the Physical Uplink Shared Channel (PUSCH).

(4) In the connection-forming state and/or the connected state, the wireless terminal may transmit messages requesting allocation of uplink transmission resources. For example, in a 3GPP LTE system, an eNodeB may allocate channel resources to be used by a UE in subsequent PUSCH transmissions.

In an embodiment, a wireless terminal may receive various types of messages (e.g., from a wireless infrastructure port), including, without limitation:

(1) In the connected state, the wireless terminal may receive data payloads that contain video, audio, and/or other types of data (e.g., email-related data, application data, etc.). For example, in the 3GPP LTE standards, such data is received in the Physical Downlink Shared Channel (PDSCH).

(2) In the connection-forming state and/or the connected state, the wireless terminal may receive transmissions that inform the wireless terminal about uplink transmission resources allocated to the wireless terminal. For example, in a 3GPP LTE system, an eNodeB may allocate channel resources to be used by a UE in subsequent PUSCH transmissions, using a Physical Downlink Control Channel (PDCCH) transmission.

(3) In the idle state, the connection-forming state, and/or the connected state, the wireless terminal may listen to configuration information of the network that is broadcast. For example, in the 3GPP LTE standards, such configuration information may be broadcast as Master Information Blocks (MIBs) and System Information Blocks (SIBs). The reception of MIBs and SIBs may not require an immediate response from the UE.

(4) In the idle state, the wireless terminal may listen to transmissions of the wireless infrastructure port in order to identify if the wireless terminal needs to form a connection with the infrastructure network. For example, in the 3GPP LTE standards, a downlink paging message may be transmitted in the PDCCH by an eNodeB. The UE does not have to respond if it does not observe any page that targets the UE in the paging opportunity.

(5) In the connection-forming state, a wireless terminal may receive a message informing the wireless terminal that a connection has been granted to the wireless terminal. An example of such a message is the RRC connection setup message in the 3GPP LTE standards. The RRC connection setup message informs the UE that radio bearers have been established for the UE.

In an embodiment of a wireless protocol, a transmitting node may listen for an acknowledgement message from a receiving node after a transmission to the receiving node. In addition, a receiving node may transmit an acknowledgement message after successfully receiving a message from a transmitting node. Typically, the transmission of an acknowledgement message by a receiving node is performed after a predetermined time delay following the reception being acknowledged. The predetermined time delay may be specified by the wireless protocol. Thus, the node transmitting the acknowledgement message knows when transmission of the acknowledgement message will start. As a corollary, the node awaiting the acknowledgement message (i.e., acknowledging a message previously transmitted by the node) knows when it should start receiving the acknowledgement message.

2.3. Transmission and Reception Events

In an embodiment, the basic transmission-related operational actions or events that may be executed in a wireless device include, without limitation:

(1) Transmission Event 1: Data Production. In this operational event, raw data to be transmitted is produced. For example, this event may comprise the performance of voice capture for an audio transmission. As another example, in a Global Positioning System (GPS) tracker in which the location of a wireless device is periodically acquired, this event may comprise the performance of demodulation of GPS signals.

(2) Transmission Event 2: Transmission Data Preparation. In this operational event, the raw data is processed in preparation for transmission. This processing may include, for example, processing within interconnection layers 132 (e.g., OSI stack processing) from the application layer to the physical layer (e.g., the digital baseband physical layer).

(3) Transmission Event 3: Transmission Analog Components Activation. In this operational event, the wireless device may activate analog and radio frequency (RF) components of the transmitter chain. For example, synchronization and clocking circuits (e.g., synthesizers) may be activated, phase-locked loops (PLLs) may be activated and converge, digital-to-analog converters (ADCs) may be activated, transmitter RF components (e.g., filters, up-converters, gain stages, etc.) may be powered up and initialized, power amplifiers and front-end duplexer circuits (if applicable) may be powered up, and/or the like.

(4) Transmission Event 4: RF Transmission. In this operational event, a signal is transmitted from the antenna of the wireless device.

(5) Transmission Event 5: Transmission Analog Components Power Savings. In this operational event, a selected power-saving configuration is implemented for the analog components used for transmission. Specifically, the transmission analog components are controlled to the selected power-saving configuration, which may be a fully-enabled configuration, a fully-powered-down configuration, or any of one or more intermediate configurations (i.e., consuming less power than the fully-enabled configuration but more power than the fully-powered-down configuration).

(6) Transmission Event 6: Transmission Digital Components Power Savings. In this operational event, a selected power-saving configuration is implemented for the digital components used for transmission. Specifically, the transmission digital components are controlled to the selected power-saving configuration, which may be a fully-enabled configuration, a fully-powered-down configuration, or any of one or more intermediate configurations.

In an embodiment, the basic reception-related operational actions or events that may be executed in a wireless device include, without limitation:

(1) Reception Event 1: Reception Analog Components Activation. In this operational event, the RF reception system is prepared for reception. For example, RF components (e.g., synthesizers, PLLs, low-noise amplifiers (LNAs), filters, amplifiers, etc.) and ADCs may be powered up and initialized.

(2) Reception Event 2: Reception Digital Components Activation. In this operational event, the digital baseband reception system is prepared for reception. This preparation may include activation of digital signal processing elements that process received signals. For example, this preparation may involve systems that pertain to processing in one or more of interconnection layers 132 (e.g., OSI layers 1 through 7).

(3) Reception Event 3: RF Reception. In this operational event, the RF signals received via an antenna of the wireless device are processed in the RF and analog components.

(4) Reception Event 4: Digital Reception. In this operational event, baseband signals received and provided by the RF components are processed by the digital baseband components. This processing may include, for example, processing in interconnection layers 132 (e.g., OSI stack processing) from the physical layer (e.g., the digital baseband physical layer) to the application layer.

(5) Reception Event 5: Data Consumption. In this operational event, the received data is used in the wireless device. For example, if the received data comprises commands or information to be utilized by an application executing on the wireless device, those commands are executed or that information is consumed by the application.

(6) Reception Event 6: Reception Analog Components Power Savings. In this operational event, a selected power-saving configuration is implemented for the analog component used for transmission. Specifically, the transmission analog component is controlled to the selected power-saving configuration, which may be a fully-enabled configuration, a fully-powered-down configuration, or any of one or more intermediate configurations.

(7) Reception Event 7: Reception Digital Components Power Savings. In this operational event, a selected power-saving configuration is implemented for the digital component used for transmission. Specifically, the transmission digital component is controlled to the selected power-saving configuration, which may be a fully-enabled configuration, a fully-powered-down configuration, or any of one or more intermediate configurations.

A plurality of the transmission and/or reception events may occur simultaneously within a single wireless device. For example, both a transmission event and a reception event may occur simultaneously. In addition, multiple transmission events may occur simultaneously or multiple reception events may occur simultaneously (e.g., Transmission Event 3 may be performed while Transmission Event 2 is continuing).

2.4. Power-Saving Configurations

In an embodiment, a plurality of power-saving modes or configurations are available for each of one or more system components (e.g., transmission analog component, transmission digital component, reception analog component, and/or reception digital component). The power-saving configurations may comprise a fully-powered-down configuration, a fully-enabled configuration, and zero or more intermediate configurations (i.e., consuming more power than the fully-powered-down configuration but less power than the fully-enabled configuration).

Typically, in current wireless devices, a system component may be powered down by controlling inputs to a power management integrated circuit (PMIC) to, for example, configure the rail voltages and currents that supply the system component to low-power and no-current modes, respectively. A PMIC may also be referred to as a power management unit (PMU).

An example of a low power-consuming configuration for a transmission analog component is to keep the synthesizers and PLLs functional, while powering down the transmission analog chain and/or transmission power amplifiers.

An example of a low power-consuming configuration for a transmission digital component or reception digital component is to reduce the clock speed of the digital circuits, while retaining memories, software, and/or memory configurations.

Typically, a wireless device performs a set of activations to bring a system component from a lower power-consuming configuration to the fully-enabled configuration. Each of these activations takes an amount of time. Thus, for each power-saving configuration and system component, there is a set of activations that has an associated re-enablement time span required for the system component to reach the fully-enabled configuration from the power-saving configuration. As an example, bringing the RF analog component from a powered-down configuration to the fully-enabled configuration may comprise waiting for oscillators to warm up, powering up and initializing synthesizers, powering up and initializing PLLs, waiting for the convergence of synthesizers and PLLs to their steady-state frequencies, and/or waiting for LNA, filters, amplifiers, and/or ADCs to reach their ready states.

Similarly, a wireless device typically performs a set of deactivations to bring a system component from the fully-enabled configuration to a lower power-consuming configuration. Each of these deactivations takes an amount of time. Thus, for each power-saving configuration and system component, there is a set of deactivations that has an associated deactivation time span required for the system component to reach the power-saving configuration from the fully-enabled configuration.

2.5. Cross-Layer Control

In an embodiment, a cross-layer sleep controller is disclosed for reducing power consumption in a wireless device. The cross-layer sleep controller may focus on minimizing power consumption in the wireless device by selecting a lower power-consuming configuration for each non-active time encountered by the wireless transceiver in the wireless device.

The cross-layer sleep controller may utilize information across multiple communications system layers (e.g., interconnection layers 132, which may conform to or be based on the OSI stack layers). Knowledge of the utilized wireless protocol across multiple layers and/or the behavior of the utilized application may be used to determine the next anticipated event (e.g., the next action that the wireless device will need to take) and the time at which the next anticipated event will occur (e.g., the amount of time from the current time until the next anticipated event occurs). In addition, the cross-layer sleep controller may determine the best configuration for each system component based on the time available to sleep (i.e., the time until the next transmission and/or reception event occurs), knowledge of the power consumed by each system component in each available configuration, the time needed for activation of each affected system component in each available configuration, and/or the time needed for deactivation of each affected system component in each available configuration.

As an example to illustrate cross-layer sleep control, consider a wireless device that executes Transmission Event 1 through Transmission Event 4 for transmission. Upon completing Transmission Events 1 through Transmission Event 4, the wireless device may transition to Transmission Event 5 and select a power-saving configuration for the transmission analog component, as discussed elsewhere herein. Then, the transmission analog component is brought to the selected power-saving configuration. The wireless device may also transition to Transmission Event 6, select a power-saving configuration for the transmission digital component, and bring the transmission digital component to the selected power-saving configuration.

Figure 3:
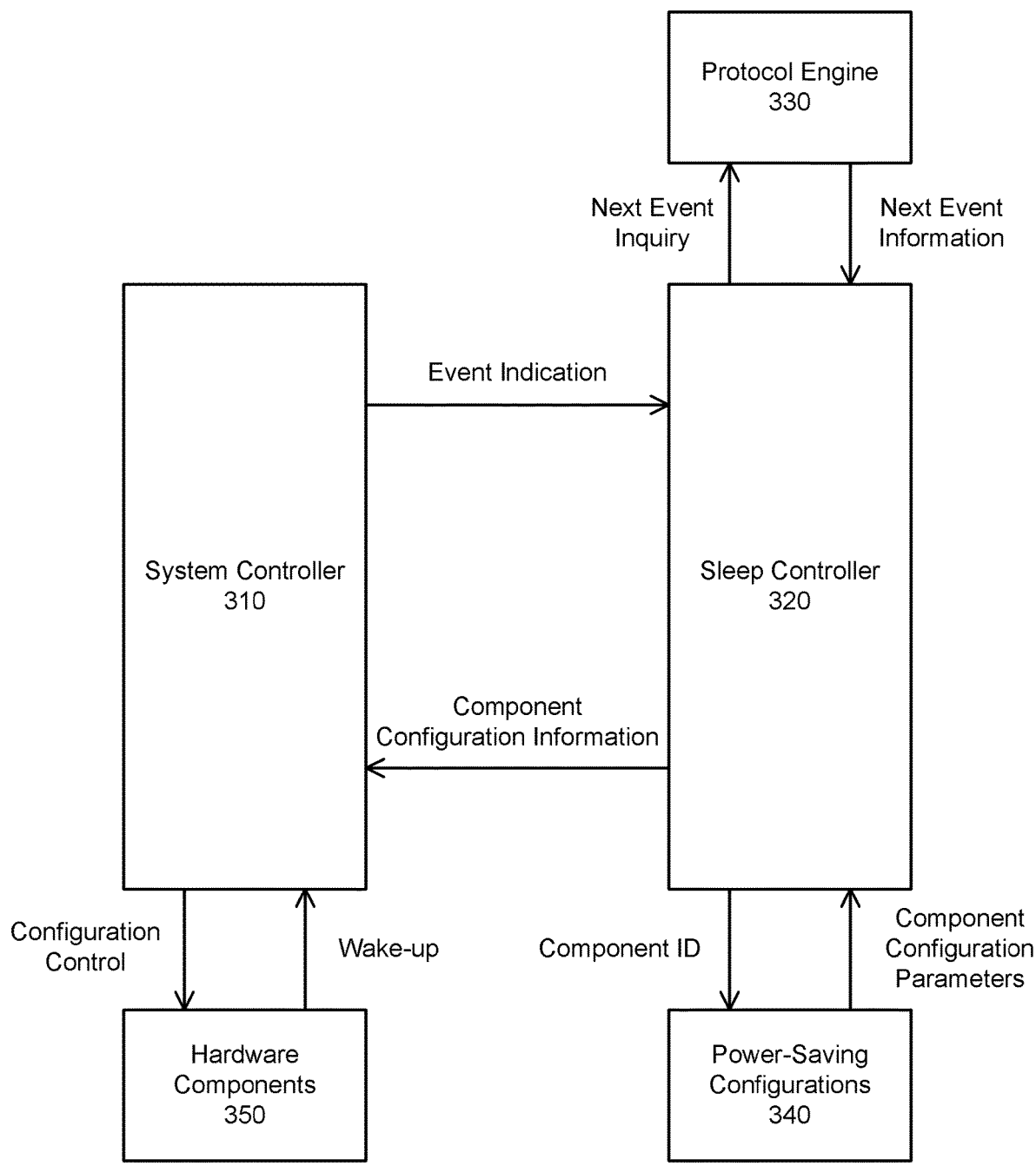
FIG. 3 is a block diagram illustrating components of a power-saving control process, according to an embodiment.

FIG. 3 is a block diagram illustrating components of a power-saving control process, according to an embodiment. In an embodiment, these components comprise a system controller 310, sleep controller 320, protocol engine 330, power-saving configurations 340, and hardware components 350. System controller 310, sleep controller 320, protocol engine 330, and power savings configurations 340 may be implemented in software and/or hardware. For example, system controller 310 and/or sleep controller 320 may each comprise, or be executed by, a processor 210.

Upon completion of a particular event or upon a determination that a particular event will occur, system controller provides a signal, indicating the particular event, to sleep controller 320. The signal may comprise a message that identifies the particular event. In an embodiment, the particular event comprises Transmission Event 4 (i.e., RF Transmission) and/or Reception Event 3 (i.e., RF Reception). In such an embodiment, system controller 310 may pass an identifier of the Transmission Event 4 or Reception Event 3 to sleep controller 320.

Sleep controller 320 receives the signal, indicating the particular event, from system controller 310. Based on the indicated event, sleep controller 320 passes a next event inquiry to protocol engine 330. The next event inquiry may comprise a message that identifies or otherwise indicates the event received by sleep controller 320 from system controller 310.

Protocol engine 330 receives the next event inquiry and determines the next event. The next event may be an event that is anticipated to immediately follow the event indicated by sleep controller 320, and may be a transmission or reception event. Protocol engine 330 may also determine the length of time until the determined next event is anticipated to occur or the time at which the determined next event is anticipated to occur. Protocol engine 330 may return the next event information, including an identifier or other indication of the next event and the determined length of time until the next event will occur or the time at which the next event will occur, to sleep controller 320. It is assumed in this case that sleep controller 320 and protocol engine 330 have access to a common time reference.

In an embodiment, protocol engine 330 has knowledge of the interaction of the wireless device with a communication partner and the state of communication across all interconnection layers 132 (e.g., OSI layers). For example, protocol engine 330 may be implemented using a state machine, such that the relationships between the various possible states are known and, given one state, the next state can be determined. Thus, protocol engine is able to determine the next event (i.e., returned to sleep controller 320) given a current or anticipated event (i.e., passed by sleep controller 320). For example, in a UE that operates according to the 3GPP LTE standards, if the UE is in the RRC idle state, Reception Event 3 is performed, and no paging signal is received from the eNodeB, protocol engine 330 knows that the next event will be a reception event which will occur after the duration of one paging cycle from the last paging opportunity. As another example, if the UE is in the RRC connected state and a downlink reception has occurred (i.e., Reception Event 3), protocol engine 330 knows that, according to the LTE protocol, an acknowledgement signal may have to be sent (e.g., typically 4 ms after the downlink reception). In both examples, protocol engine 330 can return the known next event to sleep controller 320, along with an indication of the time at which the next event will occur.

Given the next event returned by protocol engine 330, sleep controller 320 determines a set of one or more system components (e.g., the transmission analog component, the transmission digital component, the reception analog component, and the reception digital component) that will need to be active or enabled for the next event to occur. Identifiers or other indications of each system component in the determined set are then passed or used as an index to power-saving configurations 340 to retrieve one or more parameters associated with the system component for each of one or more available power-saving configurations. The available power-saving configurations may include a fully-enabled configuration, a fully-powered-down configuration, and zero or more intermediate configurations which consume less power than the fully-enabled state but more power than the fully-powered-down state. As discussed elsewhere herein, these parameters may comprise a power consumption associated with the system component operating in each power-saving configuration, an amount of time to deactivate the system component from the fully-enabled state to each power-saving configuration, and/or an amount of time required to return the system component from each power-saving configuration to a fully-enabled state.

Next, sleep controller 320 may use the one or more parameters retrieved from power-saving configurations 340 to select one of the plurality of available power-saving configurations to be used for each system component in the set of one or more system components that will need to be enabled for execution of the next event that was identified by protocol engine 330. Sleep controller 320 then returns, for each affected system component, component configuration information, associated with the power-saving configuration selected for that system component, to system controller 310. In an embodiment, the component configuration information comprises a system component identifier, a power-saving configuration identifier indicating the power-saving configuration to be used for the identified system component, and a wake-up or transition time for the identified system component.

In an embodiment, the system component identifier specifies the system component for which the other component configuration information (e.g., power-saving configuration identifier and transition time) is being provided. As an illustrative, non-limiting example that uses a two-bit identifier, the system component identifiers may be assigned as follows: 00 for the transmission digital component; 01 for the transmission analog component; 10 for the reception digital component; and 11 for the reception analog component.

In an embodiment, the power-saving configuration identifier specifies a power-saving configuration to be used for the system component specified by the associated system component identifier. As an illustrative, non-limiting example that has four power-saving configurations and uses a two-bit identifier, the power-saving configuration identifiers may be assigned as follows: 00 for a fully-powered-down configuration; 01 for a first low power-consuming configuration; 10 for a second low power-consuming configuration; and 11 for a fully-enabled configuration.

In an embodiment, the wake-up time specifies the time at which a transition to the fully-enabled configuration must begin in order for the system component, specified by the system component identifier, to reach the fully-enabled state by the time the next event occurs. The wake-up time may comprise a simple counter value or a time (e.g., expressed in a standard Coordinated Universal Time (UTC) format). Alternatively, the component configuration information may comprise a transition time which specifies the amount of time, from the current time, after which the transition to the fully-enabled configuration must begin in order for the identified system component to reach the fully-enabled state by the time the next event occurs. Sleep controller 320 may determine the wake-up time or transition time based on the re-enablement time span associated with the power-saving configuration and system component specified in power-saving configurations 340. For example, the wake-up time may be calculated as the time at which the next event is anticipated to occur minus the re-enablement time span, and the transition time may simply be the re-enablement time span.

System controller 310 receives the component configuration information from sleep controller 320, and implements configuration control based on the received component configuration information. Specifically, system controller 310 may, for each system component identified in the component configuration information, control that system component to bring the system component into the power-saving configuration, specified by the power-saving configuration identifier associated with that system component in the component configuration information. This configuration control may be implemented in a variety of ways. For example, system controller 310 may simply provide the power-saving configuration identifier to the respective system component, and the system component may automatically transition to the specified power-saving configuration. Alternatively, system controller 310 may control the specific behavior of the system component or various elements within the system component to transition the system component into the specified power-saving configuration. It should be understood that, in the event that a system component is already in the power-saving configuration specified in the component configuration information, system controller 310 may do nothing with respect to that system component.

System controller 310 may also, for each system component that is brought to a power-saving configuration, bring that system component back to the fully-enabled configuration at the appropriate time. For example, system controller 310 may determine the wake-up time (e.g., based on the wake-up time or transition time in the component configuration information) and, at the wake-up time, initiate the transition of the system component from a lower power-saving configuration to the fully-enabled configuration. The initiation of the transition to the fully-enabled configuration may be performed individually for each system component that needs to be enabled (e.g., both digital and analog components for transmission or reception). Alternatively, the system component may determine the wake-up time (e.g., based on a wake-up time or transition time relayed to it by system controller 310), and provide a signal to system controller 310 when the wake-up time has been reached. In such an embodiment, system controller 310 may be placed in a power-saving state while it awaits the signal from the system component indicating that the wake-up time has been reached.

Figure 4:
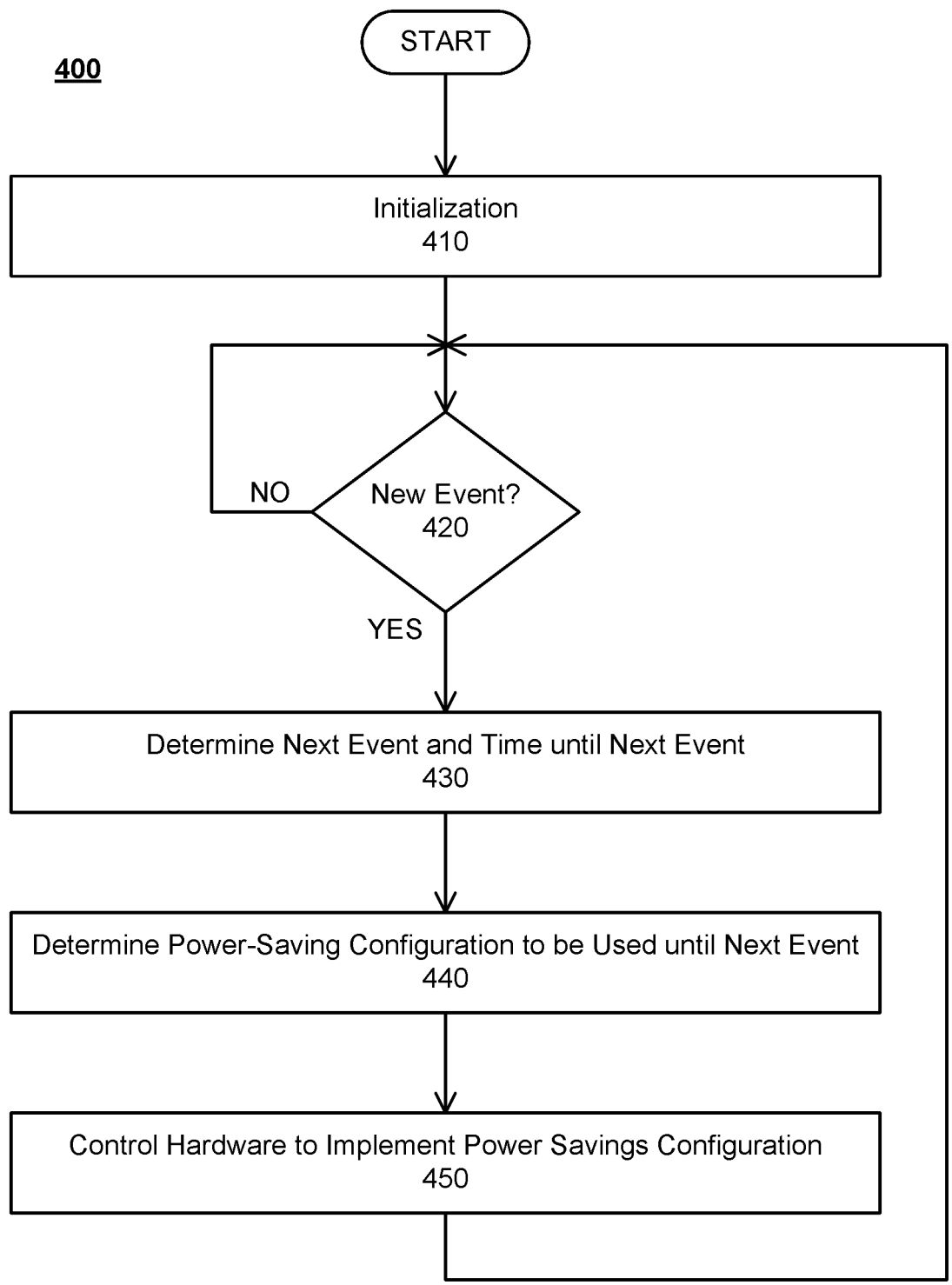
FIG. 4 is a flow diagram illustrating a power-saving control process, according to an embodiment.

FIG. 4 is a flow diagram illustrating a power-saving control process 400, according to an embodiment. The illustrated power-saving control process 400 may be implemented in software and/or hardware, within and/or across any of interconnection layers 132. For example, process 400 may be implemented using the functional modules illustrated and described with respect to FIG. 3. In addition, process 400 may be implemented with more, fewer, or a different arrangement of steps than illustrated in FIG. 4.

In step 410, process 400 is initialized. Initialization may comprise loading the contents of look-up tables or other databases (e.g., representing power-saving configurations 340). This initialization may be performed when the wireless device is initialized, or every time an event indication (e.g., specifying either Transmission Event 4 or Reception Event 3) is provided from system controller 310 to sleep controller 320.

In step 420, process 400 blocks or waits until an indication of a new event is received. For example, sleep controller 320 may wait until an indication of the Transmission Event 4 or Reception Event 3 is received from system controller 310. When a new event indication is received (i.e., "YES" in step 420), process 400 proceeds to step 430. Otherwise, if a new event indication is not received (i.e., "NO" in step 420), process 400 continues to wait for a new event indication.

In step 430, the next event and the time span until that next event occurs is determined. For example, step 430 may be performed by sleep controller 320 requesting the next event from protocol engine 330, and receiving the next event and its associated time span from protocol engine 330 in response to the request.

In step 440, the power-saving configuration to be used until the next event (e.g., until the wake-up time for the next event) is determined. Step 440 may be performed for each system component that will be needed for the next event, to determine the power-saving configuration to be used for each system component. For example, if the next event is a transmission, step 440 may be performed for both the transmission digital component and the transmission analog component. Similarly, if the next event is a reception, step 440 may be performed for both the reception digital component and the reception analog component. In an embodiment, step 440 is performed by sleep controller 320 retrieving parameters (e.g., power consumption, re-enablement time span, and deactivation time span) for each system component and potential power-saving configuration for that system component from power-saving configurations 340, and selecting a potential power-saving configuration to be used for each system component.

In step 450, each affected system component is controlled to implement the selected power-saving configuration for that system component, and process 400 may return to step 420. For instance, as discussed elsewhere herein, system controller 310 may request or control transition of each affected system component to the power-saving configuration selected for that system component. However, it should be understood that, in the event that an affected system component is already in the selected power-saving configuration, no transition needs to be performed.

2.6. Power-Saving Configuration Selection

Embodiments of a process for selecting a power-saving configuration from a plurality of available power-saving configurations will now be described. This selection process may be implemented by sleep controller 320 in FIG. 3 and correspond to step 440 in process 400 illustrated in FIG. 4. It should be understood that, as used herein, the term "power-saving configuration" may include the fully-enabled state, even though the fully-enabled state may not involve relative power savings.

As discussed elsewhere herein, upon receiving a signal, indicating the completion or anticipated occurrence of a particular event (e.g., Transmission Event 4 or Reception Event 3), from system controller 310, sleep controller 320 may utilize a system component identifier, for each system component affected by the next event to occur, to retrieve one or more parameters associated with each of a plurality of potential power-saving configurations. These parameters may comprise, for each of the potential power-saving configurations, a power consumption value representing the amount of power consumed (e.g., in milliamps) by the system component in the power-saving configuration, a re-enablement time span value (e.g., in microseconds, in nanoseconds, as a counter value, etc.) indicating the amount of time required to transition from the power-saving configuration to the fully-enabled configuration, and a deactivation time span value (e.g., in microseconds, in nanoseconds, as a counter value, etc.) indicating the amount of time required to transition from the fully-enabled configuration to the power-saving configuration.

In an embodiment, the parameters may be retrieved from a database (e.g., power-saving configurations 340) which stores a set of parameters for each power-saving configuration of each system component. This database may be implemented as a look-up table, as illustrated for example in Table 1 below for M distinct system components and N distinct power-saving configurations:

TABLE 1

Example look-up table for component-specific power-saving configurations

| System Component Identifier | Power-Saving Configuration | Power Consumption (PC) | Re-Enablement Time Span (RT) | Deactivation Time Span (DT) |
|---|---|---|---|---|
| SC1 | Fully-Powered-Down | PC (1, 1) | RT (1, 1) | DT (1, 1) |
| SC1 | Low Power 1 | PC (1, 2) | RT (1, 2) | DT (1, 2) |
| SC1 | ... | ... | ... | ... |

TABLE 1-continued

Example look-up table for component-specific power-saving configurations

| System Component Identifier | Power-Saving Configuration | Power Consumption (PC) | Re-Enablement Time Span (RT) | Deactivation Time Span (DT) |
|---|---|---|---|---|
| SC1 | Low Power N | PC (1, N − 1) | RT (1, N − 1) | DT (1, N − 1) |
| SC1 | Fully-Enabled | PC (1, N) | RT (1, N) | DT (1, N) |
| SC2 | Fully-Powered-Down | PC (2, 1) | RT (2, 1) | DT (2, 1) |
| SC2 | Low Power 1 | PC (2, 2) | RT (2, 2) | DT (2, 2) |
| SC2 | ... | ... | ... | ... |
| SC2 | Low Power N | PC (2, N − 1) | RT (2, N − 1) | DT (2, N − 1) |
| SC2 | Fully-Enabled | PC (2, N) | RT (2, N) | DT (2, N) |
| ... | ... | ... | ... | ... |
| SCM | Fully-Powered-Down | PC (M, 1) | RT (M, 1) | DT (M, 1) |
| SCM | Low Power 1 | PC (M, 2) | RT (M, 2) | DT (M, 2) |
| SCM | ... | ... | ... | ... |
| SCM | Low Power N | PC (M, N − 1) | RT (M, N − 1) | DT (M, N − 1) |
| SCM | Fully-Enabled | PC (M, N) | RT (M, N) | DT (M, N) |

As discussed elsewhere herein, there may be four distinct system components: (1) transmission digital component; (2) transmission analog component; (3) reception digital component; and (4) reception analog component. In addition, the power-saving configurations may comprise a fully-powered-down configuration, a fully-enabled configuration, and zero or more intermediate configurations between the fully-power-down and fully-enabled configurations.

Typically, the power consumption in each power-saving configuration (e.g., PC(m,n)) for each system component increases monotonically from a lowest power consumption in the fully-powered-down state to a highest power consumption in the fully-enabled configuration, whereas the re-enablement and deactivation time spans (e.g., RT(m,n) and DT(m,n), respectively) decrease monotonically from lowest time spans in the fully-enabled configuration (e.g., 0 ms) to highest time spans in the fully-powered-down configuration. This is due to the fact that lower power-consuming states for a system component are generally achieved by placing a greater number of elements within the system component into a lower power-consuming configuration. Thus, to reach lower power-consuming states, more time is required to power down the greater number of elements, and to reach higher power-consuming states, more time is required to power up the greater number of elements. It should be understood that both the re-enablement and deactivation time spans for the fully-enabled configuration (e.g., RT(M,N) and DT(M,N), respectively) may be zero, since no change in configuration needs to be performed when a system component that is already in the fully-enabled state must be operated in the fully-enabled state.

The power consumption in each power-saving configuration for each system component may be calculated by summing the power consumptions, in the power-saving configuration, of all elements of the system component. For example, the power consumption for a power-saving configuration, in which the transmission synthesizer and PLLs remain active but the transmission chain is powered down, may be calculated as the sum of the power consumption of the transmission synthesizer, the power consumption of the PLLs, and the power consumptions, if any, of the powered-down transmission chain elements, such as leakage currents, and/or the like. In addition, the power consumptions of system interface circuits, the PMIC, as well as power consumption due to inefficiencies and/or leakage currents, may be added to the power consumption values for each power-saving configuration.

The re-enablement time span in each power-saving configuration for each system component may be calculated based on the activation time spans for elements in the system component that need to be activated or powered up to reach the fully-enabled configuration from the particular power-saving configuration. For example, a calculation of the re-enablement time span for the transmission analog component in a fully-powered-down configuration may be based on the activation time spans for synthesizers, PLLs, all transmission chain elements, and/or relevant interface circuits. In an embodiment, the activation time spans for all elements, needing to be activated, may be summed. However, in the event that two or more elements may be activated simultaneously, the re-enablement time span may take this into account, for example, by only including the longest activation time span from the elements which may be simultaneously activated.

The deactivation time span in each power-saving configuration for each system component may be calculated based on the deactivation time spans for elements in the system component that need to be deactivated or powered down to reach the power-saving configuration from the fully-enabled configuration. For example, a calculation of the deactivation time span for the transmission analog component in a fully-powered-down configuration may be based on the deactivation time spans for synthesizers, PLLs, all transmission chain elements, and/or relevant interface circuits. In an embodiment, the deactivation time spans for all elements, needing to be deactivated or powered down, may be summed. However, in the event that two or more elements may be deactivated simultaneously, the deactivation time span may take this into account, for example, by only including the longest deactivation time span from the elements which may be simultaneously deactivated.

It should be understood that the re-enablement and deactivation time spans may vary for different power-saving configurations and may depend on the various elements needing to be activated or powered up. For example, if the transmission or reception digital component is re-enabled from a power-saving configuration which is simply using a lower clock rate, re-enablement of the component may be very fast. However, if the transmission or reception digital component is re-enabled from a power-saving configuration in which timing-related counters have been powered down, re-enablement may be slower since it may require acquiring downlink signals from the wireless infrastructure port (e.g., eNodeB) and using the acquired downlink signals to perform synchronization with the wireless infrastructure port.

In an embodiment, the selection (e.g., by sleep controller 320) of the power-saving configuration to be used for a particular system component prior to a next event may be based on the type of the next event (e.g., acquired from protocol engine 330), the time at which the next event is expected to occur (e.g., acquired from protocol engine 330), the re-enablement time span for the power-saving configuration, and/or the deactivation time span for the power-saving configuration. In addition, the selection may consider the parameters (e.g., re-enablement time span and/or deactivation time span) for each of the plurality of potential power-saving configurations or a subset of two or more of the plurality of potential power-saving configurations, and select the most appropriate power-saving configuration from among the plurality of potential power-saving configurations.

In an embodiment, the power-saving configuration that is selected for a given system component is the one of the plurality of power-saving configurations that has the highest sum of re-enablement and deactivation time spans that is less than the time span until the time at which the next event will occur. In other words, given a time span $\Delta t$ until the occurrence of the next event, the power-saving configuration having the maximum $RT(m,n)+DT(m,n)$ less than $\Delta t$ would be selected for a given system component.

As an example, assume that Transmission Event 4 or Reception Event 3 has been identified by system controller 310 to sleep controller 320, and the next event is determined by protocol engine 330 to be a transmit event. In this case, sleep controller 320 determines that the transmission digital component and transmission analog component must be active for the next event, and therefore, retrieves the re-enablement time spans and deactivation time spans for each of the power-saving configurations for both the transmission digital component (e.g., $RT(1,1)$-$RT(1,N)$ and $DT(1,1)$-$DT(1,N)$) and the transmission analog component (e.g., $RT(2,1)$-$RT(2,N)$ and $DT(2,1)$-$DT(2,N)$). For the transmission digital component, sleep controller 320 calculates $RT(1,i)+DT(1,i)$ from $i=1$ to $i=N$, or for at least as long $RT(1,i)+DT(1,i)$ is less than $\Delta t$, which represents the amount of time until the occurrence of the next event. Sleep controller 320 may then determine the maximum sum $RT(1,i)+DT(1,i)$ that is less than $\Delta t$, and select the power-saving configuration associated with that maximum sum as the configuration to be used for the transmission digital component. A similar process may be performed for the transmission analog component, using $RT(2,j)+DT(2,j)$ from $j=1$ to $j=N$ and the same $\Delta t$.

As another example, assume that Transmission Event 4 or Reception Event 3 has been identified by system controller 310 to sleep controller 320, and the next event is determined by protocol engine 330 to be a reception event. In this case, sleep controller 320 determines that the reception digital component and reception analog component must be active for the next event, and therefore, retrieves the re-enablement time spans and deactivation time spans for each of the power-saving configurations for both the reception digital component (e.g., $RT(3,1)$-$RT(3,N)$ and $DT(3,1)$-$DT(3,N)$) and the reception analog component (e.g., $RT(4,1)$-$RT(4,N)$ and $DT(4,1)$-$DT(4,N)$). For the reception digital component, sleep controller 320 calculates $RT(3,i)+DT(3,i)$ from $i=1$ to $i=N$, or for at least as long $RT(3,i)+DT(3,i)$ is less than $\Delta t$, which represents the amount of time until the occurrence of the next event. Sleep controller 320 may then determine the maximum sum $RT(3,i)+DT(3,i)$ that is less than $\Delta t$, and select the power-saving configuration associated with that maximum sum as the configuration to be used for the reception digital component. A similar process may be performed for the reception analog component, using $RT(4,j)+DT(4,j)$ from $j=1$ to $j=N$ and the same $\Delta t$.

In an embodiment, different selection criteria may be used in addition to or instead of a straight sum of the re-enablement and deactivation time spans. Such selection criteria may be used to optimize the selection process by, for example, ensuring that any savings in power consumption achieved by the selected power-saving configuration for a given system component is not negated by the additional power consumption required to enable or deactivate the system component. As an alternative, a formula or other function may be used. The function may accept, as inputs, the power consumptions of one or more power-saving configurations, the re-enablement time spans for those power-saving configurations, the deactivation time spans for those power-saving configurations, and/or other parameters related to those power-saving configurations, re-enablement, and/or deactivation, and output a power-saving configuration identifier specifying the selected power-saving configuration.

An example of an additional selection criterion is a condition that the power consumption in the selected power-saving configuration for a given system component must be at least a threshold amount (e.g., a threshold amount of power, a threshold percentage, etc.) less than the power consumption of the system component in the fully-enabled configuration. The threshold amount may be set so as to offset the additional power consumption required to activate and/or deactivate the system component. As an example, if the threshold amount is 20%, the selected power-saving configuration will be the power-saving configuration having the maximum RT+DT which is less than $\Delta t$ and for which the power consumption is less than or equal to 80% of the power consumption in the fully-enabled configuration.

Alternatively, the parameters stored in association with each power-saving configuration for each system component may also comprise a re-enablement power consumption, representing an amount of power needed to transition to the fully-enabled state from the power-saving configuration, and/or a deactivation power consumption, representing an amount of power needed to transition to the power-saving configuration from the fully-enabled state. These parameter(s) may be represented as additional columns to the look-up table exemplified in Table 1. In this alternative embodiment, the re-enablement energy consumption and/or deactivation energy consumption can be added to or otherwise considered in combination with the existing energy consumption, representing the amount of energy consumed by a system component in the power-saving configuration, to determine whether selection of the power-saving configuration will result in a reduction in energy consumption over the fully-enabled state. The energy consumption during any of the above time intervals can be determined by multiplying the power consumption during the interval with the length of the time interval. In this manner, power-saving configurations which would not result in energy savings or a threshold degree of power savings can be eliminated from consideration during the selection process.

Another example of an additional selection criterion is a condition that the sum of the re-enablement and deactivation time spans for the selected power-saving configuration for a given system component must be at least a threshold amount (e.g., a threshold amount of time, a threshold percentage, etc.) less than the amount of time until the occurrence of the next event. The threshold amount may be set to ensure that the system component remains in the selected power-saving configuration for a sufficient amount of time to render the deactivation and re-enablement effective or efficient in terms of reducing power consumption. As an example, if the threshold amount is x, the selected power-saving configuration will be the power-saving configuration having the maximum RT+DT which is less than Δt-x.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method comprising using at least one hardware processor to: for each of one or more system components and for each of a plurality of power-saving configurations, store one or more parameters associated with the system component and the power-saving configuration; and,
   when a detected event is of a predetermined type of event,
     determine a next event that is anticipated to follow the detected event,
     determine a time span from a current ti me until a time at which the next event is anticipated to occur,
     determine at least one of the one or more system components required for the next event, and,
     for the at least one system component,
       for each of one or more of the plurality of power-saving configurations, retrieve the one or more parameters associated with the at least one system component and the power-saving configuration,
       select one of the plurality of power-saving configurations to be used for the at least one system component based on the retrieved one or more parameters and the time span, and based on one or more criteria, wherein the one or more criteria comprise:
         a sum of the re-enablement time span and the deactivation time span, associated with the power-saving configuration, being a maximum among all of the plurality of power-saving configurations associated with a re-enablement time span and a deactivation timespan whose sum is less than the time span from the current time until the time at which the next event is anticipated to occur; and
       control the at least one system component to transition to the selected power-saving configuration, and
     wherein the one or more criteria further comprise the sum of the re-enablement time span and the deactivation time span, associated with the power-saving configuration, being a maximum among all of the plurality of power-saving configurations associated with a re-enablement time span and a deactivation time span whose sum is at least a threshold amount less than the time span from the current time until the time at which the next event is anticipated to occur.

2. The method of claim 1, wherein the one or more parameters associated with each system component and power-saving configuration comprise a power consumption of the system component while operating in the power-saving configuration, a re-enablement time span for transitioning from the power-saving configuration to a fully-enabled configuration in which the system component is fully enabled, and a deactivation time span for transitioning from the fully-enabled configuration to the power-saving configuration.

3. The method of claim 1, wherein the one or more criteria further comprise the power consumption, associated with the at least one system component in the power-saving configuration, being at least a threshold amount less than a power consumption associated with the at least one system component in the fully-enabled configuration.

4. The method of claim 3, wherein the threshold amount is a percentage.

5. The method of claim 1, wherein the predetermined type of event comprises a transmission event.

6. The method of claim 5, wherein the one or more system components comprise one or both of a transmission analog component and a transmission digital component, and wherein each of the transmission analog component and the transmission digital component comprises one or more elements for wirelessly transmitting data.

7. The method of claim 1, wherein the predetermined type of event comprises a reception event.

8. The method of claim 7, wherein the one or more system components comprise one or both of a reception analog component and a reception digital component, and wherein each of the reception analog component and the reception digital component comprises one or more elements for wirelessly receiving data.

9. A wireless device comprising:
   a battery; and
   at least one hardware processor configured to,
     for each of one or more system components and for each of a plurality of power-saving configurations, store one or more parameters associated with the system component and the power-saving configuration, and,
     when a detected event is of a predetermined type of event,
       determine a next event that is anticipated to follow the detected event,
       determine a time span from a current ti me until a time at which the next event is anticipated to occur,
       determine at least one of the one or more system components required for the next event, and,
       for the at least one system component,
         for each of one or more of the plurality of power-saving configurations, retrieve the one or more parameters associated with the at least one system component and the power-saving configuration,
         select one of the plurality of power-saving configurations to be used for the at least one system component based on the retrieved one or more parameters and the time span, and based on one or more criteria, wherein the one or more criteria comprise:

a sum of the re-enablement time span and the deactivation time span, associated with the power-saving configuration, being a maximum among all of the plurality of power-saving configurations associated with a re-enablement time span and a deactivation time span whose sum is less than the time span from the current time until the time at which the next event is anticipated to occur; and control the at least one system component to transition to the selected power-saving configuration, and wherein the one or more criteria further comprise the sum of the re-enablement time span and the deactivation time span, associated with the power-saving configuration, being a maximum among all of the plurality of power-saving configurations associated with a re-enablement time span and a deactivation time span whose sum is at least a threshold amount less than the time span from the current time until the time at which the next event is anticipated to occur.

10. A non-transitory computer-readable medium having instructions stored therein, wherein the instructions, when executed by a processor, cause the processor to:

for each of one or more system components and for each of a plurality of power-saving configurations, store one or more parameters associated with the system component and the power-saving configuration; and, when a detected event is of a predetermined type of event, determine a next event that is anticipated to follow the detected event, determine a time span from a current time until a time at which the next event is anticipated to occur, determine at least one of the one or more system components required for the next event, and, for the at least one system component, for each of one or more of the plurality of power-saving configurations, retrieve the one or more parameters associated with the at least one system component and the power-saving configuration, select one of the plurality of power-saving configurations to be used for the at least one system component based on the retrieved one or more parameters and the time span, and based on one or more criteria, wherein the one or more criteria comprise:

a sum of the re-enablement time span and the deactivation time span, associated with the power-saving configuration, being a maximum among all of the plurality of power-saving configurations associated with a re-enablement time span and a deactivation timespan whose sum is less than the time span from the current time until the time at which the next event is anticipated to occur; and control the at least one system component to transition to the selected power-saving configuration, and wherein the one or more criteria further comprise the sum of the re-enablement time span and the deactivation time span, associated with the power-saving configuration, being a maximum among all of the plurality of power-saving configurations associated with a re-enablement time span and a deactivation time span whose sum is at least a threshold amount less than the time span from the current time until the time at which the next event is anticipated to occur.

* * * * *